(12) United States Patent
Yabu et al.

(10) Patent No.: US 9,487,168 B2
(45) Date of Patent: Nov. 8, 2016

(54) AUTOMOBILE BUMPER BEAM

(71) Applicant: HONDA MOTOR CO., LTD., Minato-Ku, Tokyo (JP)

(72) Inventors: Tomoya Yabu, Wako (JP); Masakazu Kashiwagi, Wako (JP); Yusuke Maesako, Wako (JP); Akira Hojo, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/924,159

(22) Filed: Oct. 27, 2015

(65) Prior Publication Data

US 2016/0121827 A1   May 5, 2016

(30) Foreign Application Priority Data

Oct. 30, 2014   (JP) ................................. 2014-221364
Oct. 30, 2014   (JP) ................................. 2014-221365

(51) Int. Cl.
*B60R 19/18*   (2006.01)
*B60R 19/03*   (2006.01)

(52) U.S. Cl.
CPC ............... *B60R 19/18* (2013.01); *B60R 19/03* (2013.01); *B60R 2019/1853* (2013.01); *B60R 2019/1866* (2013.01)

(58) Field of Classification Search
CPC .......... B60R 19/18; B60R 2019/1866; B60R 19/03; B60R 2019/1853
USPC ....................................................... 293/120
See application file for complete search history.

(56) References Cited

U.S. PATENT DOCUMENTS

| 7,052,056 B2 | 5/2006 | Weissenborn et al. |
| 7,954,865 B2 | 6/2011 | Schwarz et al. |

(Continued)

FOREIGN PATENT DOCUMENTS

| IN | WO 2012056350 A1 * | 5/2012 | ............. B60R 19/18 |
| JP | H04-15141 A | 1/1992 | |

(Continued)

OTHER PUBLICATIONS

Official Communication dated Sep. 7, 2016 issued in the corresponding Japanese patent application 2014-221365.

(Continued)

*Primary Examiner* — Pinel Romain
(74) *Attorney, Agent, or Firm* — Carrier Blackman & Associates, P.C.; Joseph P. Carrier; William D. Blackman

(57) ABSTRACT

An automobile bumper beam to be disposed in a vehicle width direction includes: a small sectional area portion at a center in the vehicle width direction; paired sectional area changing portions continuous to outsides in the vehicle width direction of the small sectional area portion; and paired large sectional area portions continuous to outsides in the vehicle width direction of the sectional area changing portions. The small sectional area portion projects most outward in a front-rear direction at paired impact load input portions. Thus, impact load in minor collision is inputted as two-point concentrated load to the paired input portions of a bumper beam body, reducing a peak value of bending moment acting on the body, and the sectional area changing portions and large sectional area portions bear the moment, thereby enhancing strength of the body, reducing its thickness and weight, and achieving an excellent collision energy absorbing effect.

20 Claims, 7 Drawing Sheets

(56) References Cited

U.S. PATENT DOCUMENTS

| | | |
|---|---|---|
| 9,205,790 B2 | 12/2015 | Yabu et al. |
| 2015/0321631 A1* | 11/2015 | Hahn ...................... B60R 19/34 293/122 |

FOREIGN PATENT DOCUMENTS

| | | |
|---|---|---|
| JP | H06-122352 A | 5/1994 |
| JP | 2006-515541 A | 6/2006 |
| JP | 2008-001204 A | 1/2008 |
| JP | 2010-047226 A | 3/2010 |
| JP | 2014-024394 A | 2/2014 |
| WO | 2013/094515 A1 | 6/2013 |

OTHER PUBLICATIONS

Official Communication dated Aug. 31, 2016 issued in the corresponding Japanese patent application 2014-221364.

* cited by examiner

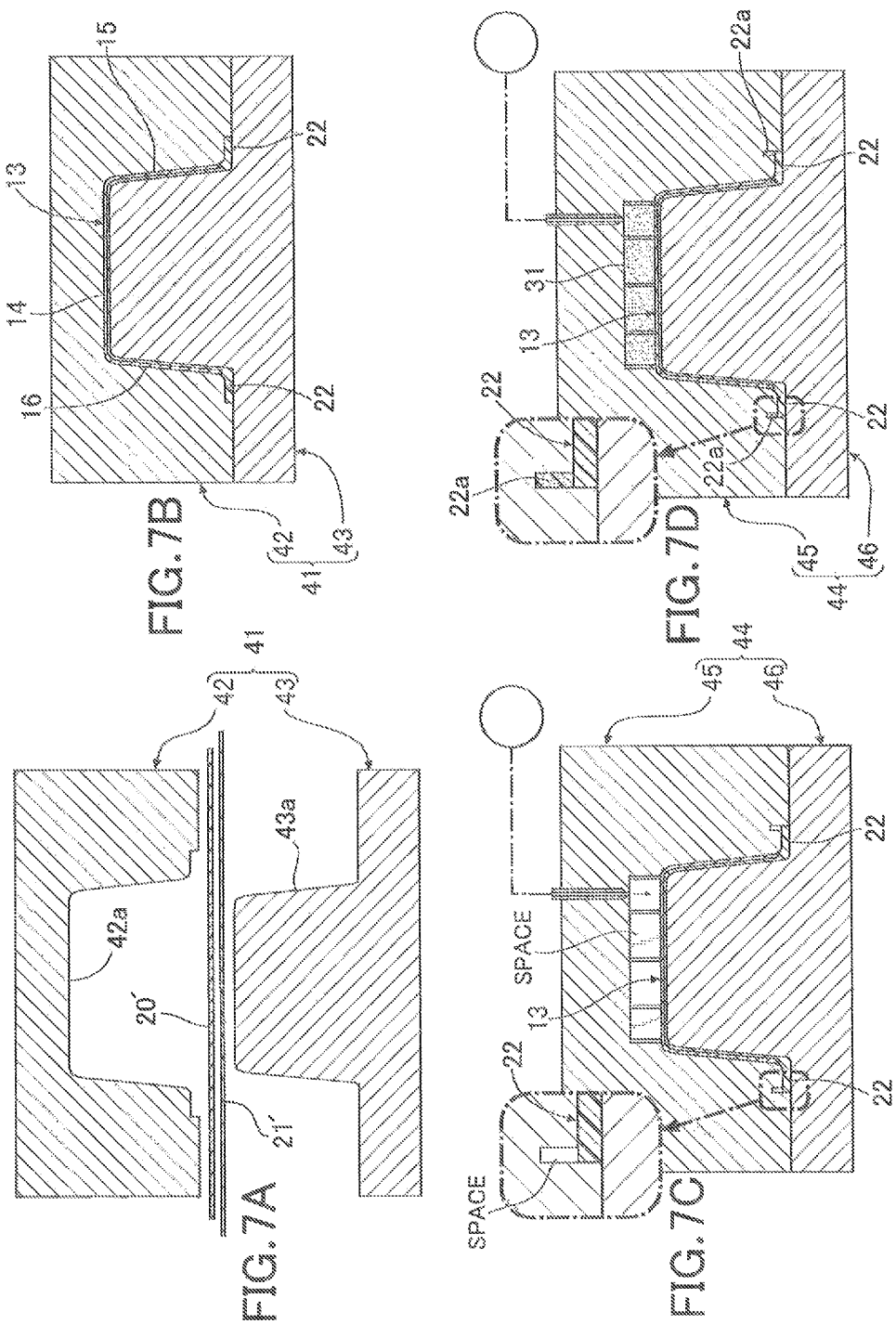

AUTOMOBILE BUMPER BEAM

CROSS REFERENCE TO RELATED APPLICATIONS

The present application claims priority under 35 U.S.C. §119 to Japanese Patent Applications No. 2014-221364 and No. 2014-221365 which were filed on Oct. 30, 2014. The entire contents of these applications are incorporated herein by reference.

BACKGROUND OF THE INVENTION

1. Field of the Invention

The present invention relates to an automobile bumper beam which is made of fiber-reinforced resin and configured to be disposed in a vehicle width direction.

2. Description of the Related Art

Japanese Patent Application Laid-open No. 2014-24394 has made known a rear bumper beam made of fiber-reinforced resin and formed by stacking two layers of a continuous fiber-reinforced resin layer and a discontinuous fiber-reinforced resin layer, and provided with two vertically arranged U-shaped sectional portions each opened toward a rear side of a vehicle body, in which opening actions of the U-shaped sectional portions attributed to a collision load are controlled by blocking openings at outer ends in a vehicle width direction of the U-shaped sectional portions by using an end wall.

In addition, U.S. Pat. No. 7,954,865 has made known a bumper beam provided with a honeycomb structure body fixed to an end portion in the vehicle width direction of the bumper beam by using hooks, in which an impact load obliquely inputted to the end portion in the vehicle width direction of the bumper beam is absorbed by a crush of the honeycomb structure body.

Meanwhile, a planar shape of the above-described conventional rear bumper beam is curved in an arc shape such that a central part in the vehicle width direction projects rearward with respect to outer end portions in the vehicle width direction which are attached to rear ends of a pair of right and left rear side frames. Accordingly, an impact load in case of a rear end collision is inputted as a load concentrated on a single point to the central part in the vehicle width direction of the rear bumper beam. Thus, an extremely large bending moment acts on the central part in the vehicle width direction of the rear bumper beam which is located away from attaching portions to the rear side frames. As a consequence, the rear bumper beam may be locally fractured at that part and may fail to sufficiently exert its energy absorption performance. In order to avoid this situation, a plate thickness of the rear bumper beam may be increased to improve its bending strength. However, this measure leads to a problem of an increase in weight of the rear bumper beam. Moreover, there is another problem that it is difficult to obtain a sufficient energy absorption performance by blocking the openings at the outer ends in the vehicle width direction of the U-shaped sectional portions only by using the end wall, when an impact load is obliquely inputted to the end portion in the vehicle width direction of the bumper beam.

On the other hand, according to the bumper beam described in U.S. Pat. No. 7,954,865, the honeycomb structure body is fixed to the bumper beam by using the hooks. For this reason, the honeycomb structure body may fall off the bumper beam due to the obliquely inputted impact load and may fail to sufficiently exert its energy absorption performance.

SUMMARY OF THE INVENTION

The present invention has been made in view of the aforementioned circumstances. An object of the present invention is to provide an automobile bumper beam, which is lightweight and has an excellent effect to absorb energy in case of a collision, and is also capable of achieving a sufficient energy absorption performance even when an impact load is obliquely inputted to an end portion in a vehicle width direction of the bumper beam.

In order to achieve the object, according to a first aspect of the present invention, there is provided an automobile bumper beam which is made of fiber-reinforced resin and configured to be disposed in a vehicle width direction, the bumper beam comprising: a small sectional area portion located at a center in the vehicle width direction; a pair of sectional area changing portions continuous to outer sides in the vehicle width direction of the small sectional area portion and each having a sectional area gradually increasing from the small sectional area portion; and a pair of large sectional area portions continuous to outer sides in the vehicle width direction of the pair of sectional area changing portions and each having a larger sectional area than that of the small sectional area portion, wherein the small sectional area portion projects most outward in a front-rear direction at a pair of impact load input portions provided on opposite end sides in the vehicle width direction of the small sectional area portion.

According to the first aspect, the bumper beam made of the fiber-reinforced resin and configured to be disposed in the vehicle width direction includes: the small sectional area portion located at the center in the vehicle width direction; the pair of sectional area changing portions continuous to the outer sides in the vehicle width direction of the small sectional area portion and each having the sectional area gradually increasing from the small sectional area portion; and the pair of large sectional area portions continuous to the outer sides in the vehicle width direction of the pair of sectional area changing portions and each having the larger sectional area than that of the small sectional area portion. Here, the small sectional area portion projects most outward in the front-rear direction at the pair of impact load input portions provided on the opposite end sides in the vehicle width direction of the small sectional area portion. Thus, an impact load in case of a minor collision is inputted to the pair of impact load input portions of the bumper beam body in such a way as to be concentrated on the two points, and thereby to reduce a peak value of bending moment acting on the bumper beam body. In addition, by causing the sectional area changing portions and the large sectional area portions to bear the bending moment, it is possible to enhance strength of the bumper beam body while reducing its thickness and thus achieving weight reduction thereof.

According to a second aspect of the present invention, in addition to the first aspect, a bumper beam body of the bumper beam is a layered body including at least two layers of a continuous fiber-reinforced resin layer formed by orienting continuous fibers in the vehicle width direction as well as in a direction orthogonal to the vehicle width direction and by bonding the continuous fibers together by use of thermoplastic resin, and a discontinuous fiber-reinforced resin layer formed by orienting discontinuous fibers in random directions and bonding the discontinuous fibers together by use of thermoplastic resin, the bumper beam body includes a bottom wall, an upper wall, and a lower wall, and has an angular U-shaped section opened on an inner side in the front-rear direction, and the bumper beam body further includes a rib made of the discontinuous fiber-reinforced resin layer and connecting the bottom wall, the upper wall, and the lower wall.

According to the second aspect, the bumper beam body is the layered body including at least two layers of: the continuous fiber-reinforced resin layer formed by orienting the continuous fibers in the vehicle width direction as well as in the direction orthogonal thereto and by bonding the continuous fibers together by use of thermoplastic resin; and the discontinuous fiber-reinforced resin layer formed by orienting the discontinuous fibers in random directions and bonding the discontinuous fibers together by use of the thermoplastic resin. Thus, by applying both the expensive continuous fiber-reinforced resin layer and the inexpensive discontinuous fiber-reinforced resin layer to the bumper beam body, it is possible to secure the strength required in the bumper beam body by use of the continuous fiber-reinforced resin layer having high strength while achieving cost reduction as compared to the case of forming the bumper beam body entirely by use of the expensive continuous fiber-reinforced resin layer. Moreover, the bumper beam body includes the bottom wall, the upper wall, and the lower wall, and has the angular U-shaped section opened on the inner side in the front-rear direction. Furthermore, the bumper beam body further includes the rib made of the discontinuous fiber-reinforced resin layer and connecting the bottom wall, the upper wall, and the lower wall. Thus, it is possible to enhance the strength of the bumper beam body by forming the rib easily from the discontinuous fiber-reinforced resin layer which is excellent in fluidity during a forming process.

According to a third aspect of the present invention, in addition to the second aspect, the rib includes a first reinforcement rib provided at each of the impact load input portions.

According to the third aspect, the rib includes the first reinforcement rib provided at each of the impact load input portions. Thus, it is possible to enhance the strength of the bumper beam body by reinforcing each impact load input portion with the first reinforcement rib.

According to a fourth aspect of the present invention, in addition to the second or third aspect, the small sectional area portion includes: a linear section extending linearly in the vehicle width direction; and curved sections which are curved from opposite ends in the vehicle width direction of the linear section toward the corresponding sectional area changing portions, and the rib includes a load distribution rib provided near a boundary portion between the linear section and each of the curved sections.

According to the fourth aspect, the small sectional area portion includes: the linear section extending linearly in the vehicle width direction; and the curved sections which are curved from the opposite ends in the vehicle width direction of the linear section toward the sectional area changing portions. Moreover, the rib includes the load distribution rib provided near the boundary portion between the linear section and each of the curved sections. Thus, it is possible to enhance the strength of the bumper beam body, by distributing to the load distribution rib a compression load which acts on the bottom wall due to an impact load inputted to the impact load input portion, so as to bear the compression load.

According to a fifth aspect of the present invention, in addition to the second or third aspect, the discontinuous fiber-reinforced resin layer includes a flange located at an edge portion of the bumper beam body and covering an edge portion of the continuous fiber-reinforced resin layer.

According to the fifth aspect, the discontinuous fiber-reinforced resin layer includes the flange which is located at the edge portion of the bumper beam body and covers the edge portion of the continuous fiber-reinforced resin layer. Thus, it is possible to enhance bending strength of the bumper beam body by using the flange made of the discontinuous fiber-reinforced resin and to prevent occurrence of cracks at the edge portion of the continuous fiber-reinforced resin layer. In addition, it is also possible to achieve cost reduction by reducing the use of the expensive continuous fibers by the amount corresponding to the flange.

According to a sixth aspect of the present invention, in addition to the second or third aspect, the discontinuous fiber-reinforced resin layer includes a plurality of vehicle body attaching portions located at each of the large sectional area portions and to be attached to a vehicle body, and the rib includes a second reinforcement rib provided at the same position in the vehicle width direction as that of at least one of the plurality of vehicle body attaching portions.

According to the sixth aspect, the discontinuous fiber-reinforced resin layer includes the multiple vehicle body attaching portions located at each of the large sectional area portions and to be attached to the vehicle body. Moreover, the rib includes the second reinforcement rib provided at the same position in the vehicle width direction as that of at least one of the multiple vehicle body attaching portions. Thus, by using the second reinforcement rib, it is possible to inhibit each large sectional area portion having the U-shaped section from deformation such that its opening is not spread after the forming process, to prevent displacements of the vehicle body attaching portions, and thereby to facilitate an operation to attach the bumper beam body to the vehicle body.

According to a seventh aspect of the present invention, in addition to the sixth aspect, the large sectional area portions include bead portions to be aligned on an axis of a vehicle body frame and extending in the front-rear direction, the large sectional area portions being configured to be attached to outer ends in the front-rear direction of the vehicle body frame by using the vehicle body attaching portions.

According to the seventh aspect, the large sectional area portions include the bead portions to be aligned on the axis of the vehicle body frame and extending in the front-rear direction, the large sectional area portions being configured to be attached to the outer ends in the front-rear direction of the vehicle body frame by using the vehicle body attaching portions. Thus, in case of an offset collision or a collision at high speed where it is not possible to absorb impact energy by use of the entire bumper beam body, an effect to absorb the impact energy can be enhanced by actively causing a crush of the large sectional area portions with the increased strength by the bead portion.

According to an eighth aspect of the present invention, in addition to any one of the first to third aspects, an impact absorbing portion is provided on an outer face in the front-rear direction of each large sectional area portion, the impact absorbing portion including a honeycomb cell having an axis extending in the front-rear direction and a third reinforcement rib supporting the honeycomb cell from inside in the vehicle width direction.

According to the eighth aspect, the impact absorbing portion is provided on the outer face in the front-rear direction of each large sectional area portion, the impact absorbing portion including the honeycomb cell having the axis extending in the front-rear direction and the third reinforcement rib supporting the honeycomb cell from inside in the vehicle width direction. Thus, when an impact load is obliquely inputted to an outer end in the vehicle width direction of the bumper beam body, it is possible not only to effectively absorb the impact energy by a crush of the honeycomb cell, but also to cause the third reinforcement rib to block the honeycomb cell from collapsing. Hence, it is possible to facilitate the crush of the honeycomb cell and to further enhance the effect to absorb the impact energy.

According to a ninth aspect of the present invention, there is provided an automobile bumper beam which is made of fiber-reinforced resin and configured to be disposed in a vehicle width direction, the bumper beam comprising: a bumper beam body having a continuous fiber-reinforced resin layer formed by orienting continuous fibers in the vehicle width direction as well as in a direction orthogonal to the vehicle width direction and bonding the continuous fibers together by use of thermoplastic resin, wherein an impact absorbing portion is provided on an outer face in the front-rear direction of each of opposite ends in the vehicle width direction of the bumper beam body, the impact absorbing portion including a honeycomb cell having an axis extending in a front-rear direction and a reinforcement rib supporting the honeycomb cell from inside in the vehicle width direction.

According to the ninth aspect, the bumper beam made of the fiber-reinforced resin and configured to be disposed in the vehicle width direction includes: the bumper beam body having the continuous fiber-reinforced resin layer formed by orienting the continuous fibers in the vehicle width direction as well as in the direction orthogonal thereto and by bonding the continuous fibers together by use of the thermoplastic resin. Here, the impact absorbing portion is provided on the outer face in the front-rear direction of each of the opposite ends in the vehicle width direction of the bumper beam body, the impact absorbing portion including the honeycomb cell having the axis extending in the front-rear direction and the reinforcement rib supporting the honeycomb cell from inside in the vehicle width direction. Thus, when an impact load is obliquely inputted to the outer end portion in the vehicle width direction of the bumper beam body, the honeycomb cell which receives the impact load first can get crushed and thereby absorb the impact energy. Moreover, the reinforcement rib blocks the honeycomb cell from collapsing inward in the vehicle width direction and can thus facilitate the crush of the honeycomb cell in the front-rear direction and enhance the effect to absorb the impact energy.

According to a tenth aspect of the present invention, in addition to the ninth aspect, the bumper beam body includes a flange formed at an edge portion of the bumper beam body, and a tip end portion of the flange and the impact absorbing portion are integrally formed by using fiber-reinforced resin which is made by short fibers being bonded together by use of thermoplastic resin.

According to the tenth aspect, the bumper beam body includes the flange formed at the edge portion of the bumper beam body, and the tip end portion of the flange and the impact absorbing portion are integrally formed by using the fiber-reinforced resin which is made by short fibers being bonded together by use of the thermoplastic resin. Thus, it is possible not only to enhance the bending strength of the bumper beam body by the reinforcement with the flange, but also to further enhance the strength of the bumper beam body by integrally forming the tip end portion of the flange and the impact absorbing portion.

According to a eleventh aspect of the present invention, in addition to the tenth aspect, the bumper beam body is formed by stacking and press-forming at least two layers of the continuous fiber-reinforced resin layer and a discontinuous fiber-reinforced resin layer which is formed by orienting discontinuous fibers in random directions and bonding the discontinuous fibers together by use of thermoplastic resin, and the tip end portion of the flange is injection-molded and integrated with the flange of the press-formed bumper beam body.

According to the eleventh aspect, the bumper beam body is formed by stacking and press-forming at least two layers of the continuous fiber-reinforced resin layer and the discontinuous fiber-reinforced resin layer which is formed by orienting the discontinuous fibers in random directions and bonding the discontinuous fibers together by use of the thermoplastic resin. Moreover, the tip end portion of the flange is injection-molded and integrated with the flange of the press-formed bumper beam body. Thus, it is possible not only to form the tip end portion of the flange easily by injection molding, but also to reduce a manufacturing cost since it is not necessary to conduct an operation to remove burrs in the flange of the press-formed bumper beam body.

According to a twelfth aspect of the present invention, in addition to the eleventh aspect, the flange is formed by covering an edge portion of the continuous fiber-reinforced resin layer with the discontinuous fiber-reinforced resin layer.

According to the twelfth aspect, the flange is formed by covering the edge portion of the continuous fiber-reinforced resin layer with the discontinuous fiber-reinforced resin layer. Thus, it is possible not only to achieve cost reduction by reducing the use of the expensive continuous fiber-reinforced resin layer by the amount corresponding to the use of the inexpensive discontinuous fiber-reinforced resin layer, but also to enhance the strength by causing the discontinuous fiber-reinforced resin layer to suppress cracks attributed to stress concentration on the edge portion of the continuous fiber-reinforced resin layer.

According to a thirteenth aspect of the present invention, in addition to any one of the tenth to twelfth aspects, vehicle body attaching portions to be attached to outer ends in the front-rear direction of a vehicle body frame are provided at a portion of the flange located on inside in the front-rear direction of the impact absorbing portion, and a second reinforcement rib is provided to the bumper beam body at a position sandwiched by the flange and the vehicle body attaching portions.

According to the thirteenth aspect, the vehicle body attaching portion to be attached to the outer ends in the front-rear direction of the vehicle body frame are provided at the portion of the flange located on the inside in the front-rear direction of the impact absorbing portion, and the second reinforcement rib is provided to the bumper beam body at a position sandwiched by the flange and the vehicle body attaching portions. Thus, the impact load inputted to the impact absorbing portion is reliably transmitted to the vehicle body frame via the bumper beam body reinforced by the second reinforcement rib. Hence, it is possible to facilitate the crush of the impact absorbing portion and to enhance the effect to absorb the impact energy.

According to a fourteenth aspect of the present invention, in addition to any one of the ninth to twelfth aspects, each of outer end portions in the vehicle width direction of the bumper beam body is bent inward in the front-rear direction, and a width in the front-rear direction of the impact absorbing portion is increased from inside toward outside in the vehicle width direction.

According to the fourteenth aspect, each of the outer end portions in the vehicle width direction of the bumper beam body is bent inward in the front-rear direction, and the width in the front-rear direction of the impact absorbing portion is increased from the inside toward the outside in the vehicle width direction. Thus, it is possible not only to enhance the effect to absorb the impact energy by increasing a dimension in the front-rear direction of the outer end portion in the vehicle width direction of the honeycomb cell and thereby increasing a crush stroke of the honeycomb cell when the oblique impact load is inputted to the outer end portion in the vehicle width direction of the bumper beam, but also to facilitate the crush of the honeycomb cell in the front-rear direction by causing the reinforcement rib formed into a triangular shape to reliably block the collapse of the honeycomb cell.

Note that a rear side frame 11 of an embodiment corresponds to the vehicle body frame of the present invention, a rear bumper beam 12 of the embodiment corresponds to the bumper beam of the present invention, a metal collar 23 of the embodiment corresponds to the vehicle body attaching portion of the present invention, a reinforcement rib 26 of the embodiment corresponds to the rib or the first reinforcement rib of the present invention, a load distribution rib 27 of the embodiment corresponds to the rib of the present invention, a reinforcement rib 28 of the embodiment corresponds to the rib or the second reinforcement rib of the present invention, and a reinforcement rib 31b of the embodiment corresponds to the third reinforcement rib or the reinforcement rib of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 7A to 7D are explanatory views of a process for forming the bumper beam. (First Embodiment)

DESCRIPTION OF THE PREFERRED EMBODIMENT

Figure 1:
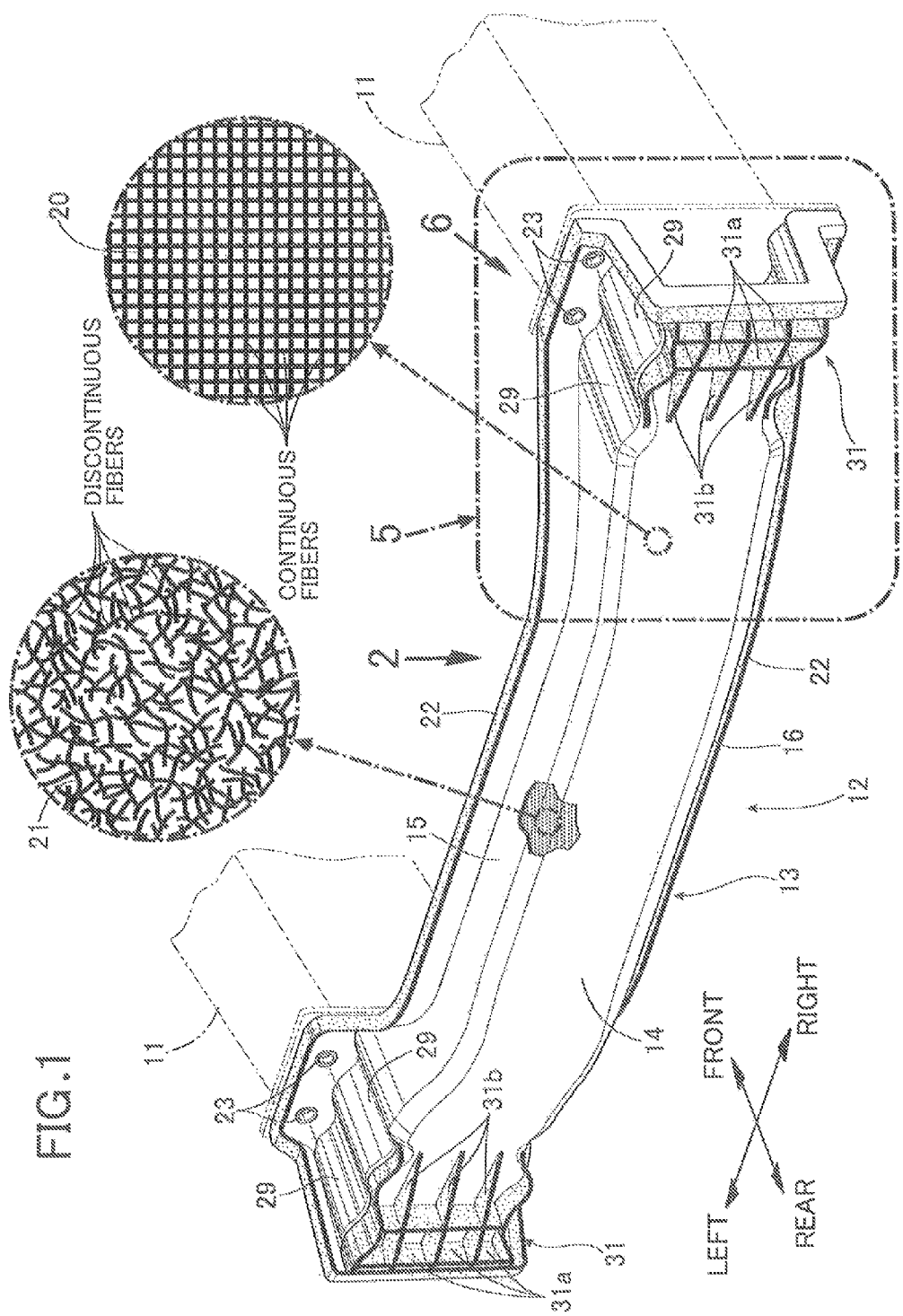
FIG. 1 is a perspective view of a rear bumper beam. (First Embodiment)

An embodiment of the present invention will be described below with reference to FIG. 1 to FIG. 7D. Note that a front-rear direction, a right-left direction (a vehicle width direction), and an up-down direction in this specification are defined on the basis of an occupant seated on a driver's seat.

[First Embodiment]

As shown in FIG. 1 to FIG. 4, a rear bumper beam 12 made of fiber-reinforced resin and extending in a vehicle width direction is attached to rear ends of a pair of right and left rear side frames 11, which are disposed at a rear part of a vehicle body of an automobile in such a way as to extend in a front-rear direction. A bumper beam body 13 forming a body of the rear bumper beam 12 includes a bottom wall 14 extending in a vertical direction, an upper wall 15 extending forward from an upper end of the bottom wall 14, and a lower wall 16 extending forward from a lower end of the bottom wall 14. The bumper beam body 13 has an angular U-shaped section opened on a front side.

The bumper beam body 13 includes: a small sectional area portion 17 located at the center in the vehicle width direction and having a relatively small and substantially constant section; large sectional area portions 18 located at opposite ends in the vehicle width direction and each having a relatively large and substantially constant section; and a pair of right and left sectional area changing portions 19 connecting outer ends in the vehicle width direction of the small sectional area portion 17 to inner ends in the vehicle width direction of the large sectional area portions 18. Each of the sectional area changing portions 19 gradually increases its sectional area from the small sectional area portion 17 toward the corresponding one of the large sectional area portions 18.

Meanwhile, the small sectional area portion 17 includes: a linear section 17a located at the center in the vehicle width direction and extending linearly; and a pair of right and left curved sections 17b which are curved forward from the outer ends in the vehicle width direction of the linear section 17a toward inner ends in the vehicle width direction of the sectional area changing portions 19. Regions near inner ends in the vehicle width direction of the curved sections 17b project most rearward, and the regions include impact load input portions P to which impact loads F are inputted in case of a rear end collision.

Outer faces of the bumper beam body 13, namely, a rear face of the bottom wall 14, an upper face of the upper wall 15, and a lower face of the lower wall 16 are formed from a continuous fiber-reinforced resin layer 20 which is made by continuous glass fibers being bonded together by use of a thermoplastic resin such as nylon and the like. Meanwhile, inner faces of the bumper beam body 13, namely, a front face of the bottom wall 14, a lower face of the upper wall 15, and an upper face of the lower wall 16 are formed from a discontinuous fiber-reinforced resin layer 21 which is made by discontinuous glass fibers being bonded together by use of a thermoplastic resin such as nylon and the like. The continuous fibers in the continuous fiber-reinforced resin layer 20 are oriented in the vehicle width direction, and in the up-down direction and in the front-rear direction which are orthogonal to the vehicle width direction.

In addition, a flange 22 is provided in a projecting manner over the entire outer peripheral edge of the bumper beam body 13. This flange 22 is also integrally formed from the discontinuous fiber-reinforced resin layer 21. At a base portion of the flange 22, an outer peripheral edge of the continuous fiber-reinforced resin layer 20 is wrapped around with the discontinuous fiber-reinforced resin layer 21.

Two metal collars 23 are buried in each of upper and lower parts of the flange 22 at each large sectional area portion 18. Bolts 24 which penetrate, from the rear to the front, the metal collars 23 and end plates 11a provided at rear ends of the rear side frames 11 are screwed into nuts 25. Thus, the bumper beam body 13 is attached to the rear side frames 11.

Figure 2:
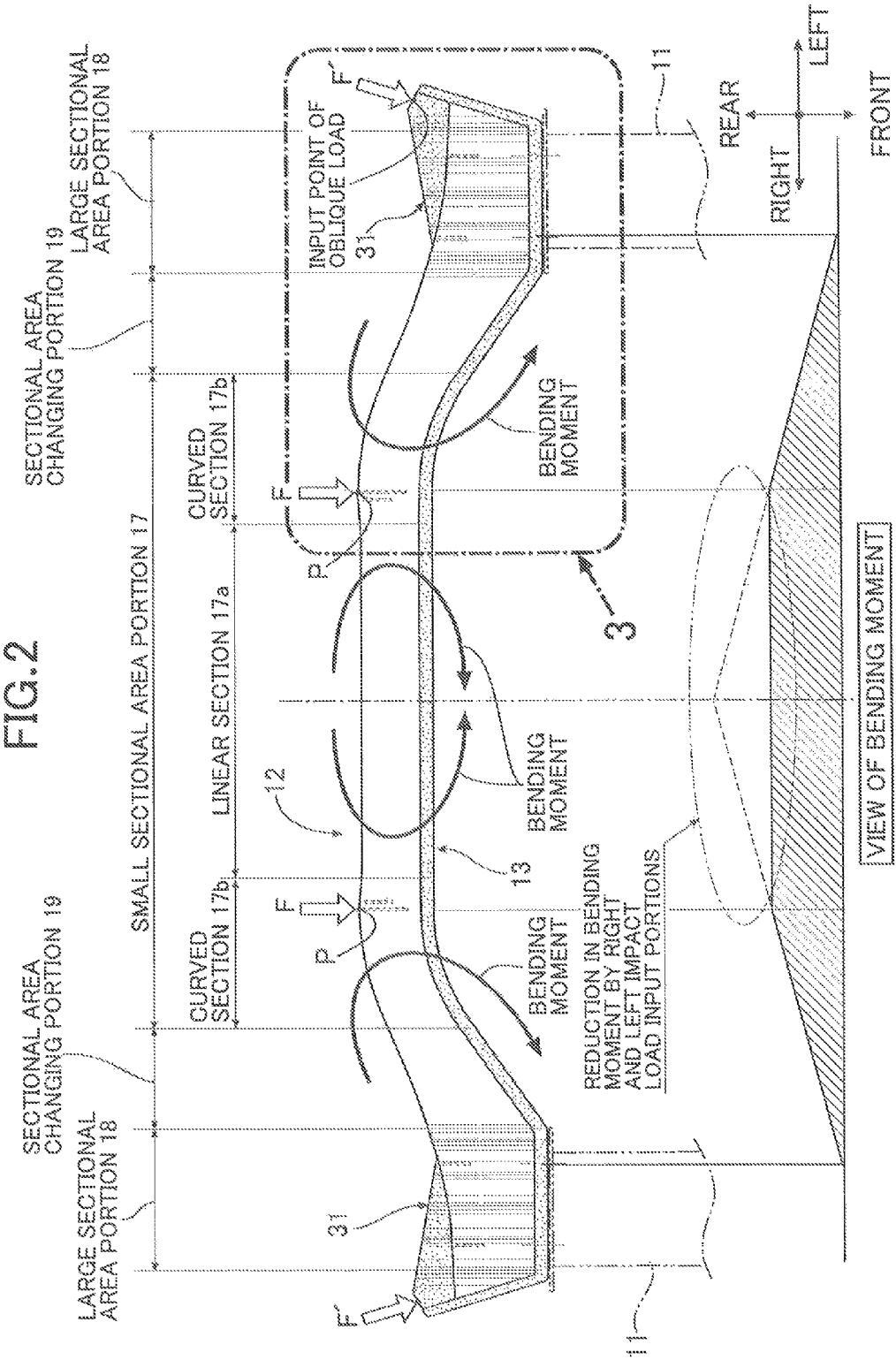
FIG. 2 is a view taken in a direction of an arrow 2 in FIG. 1. (First Embodiment)
Figure 3:
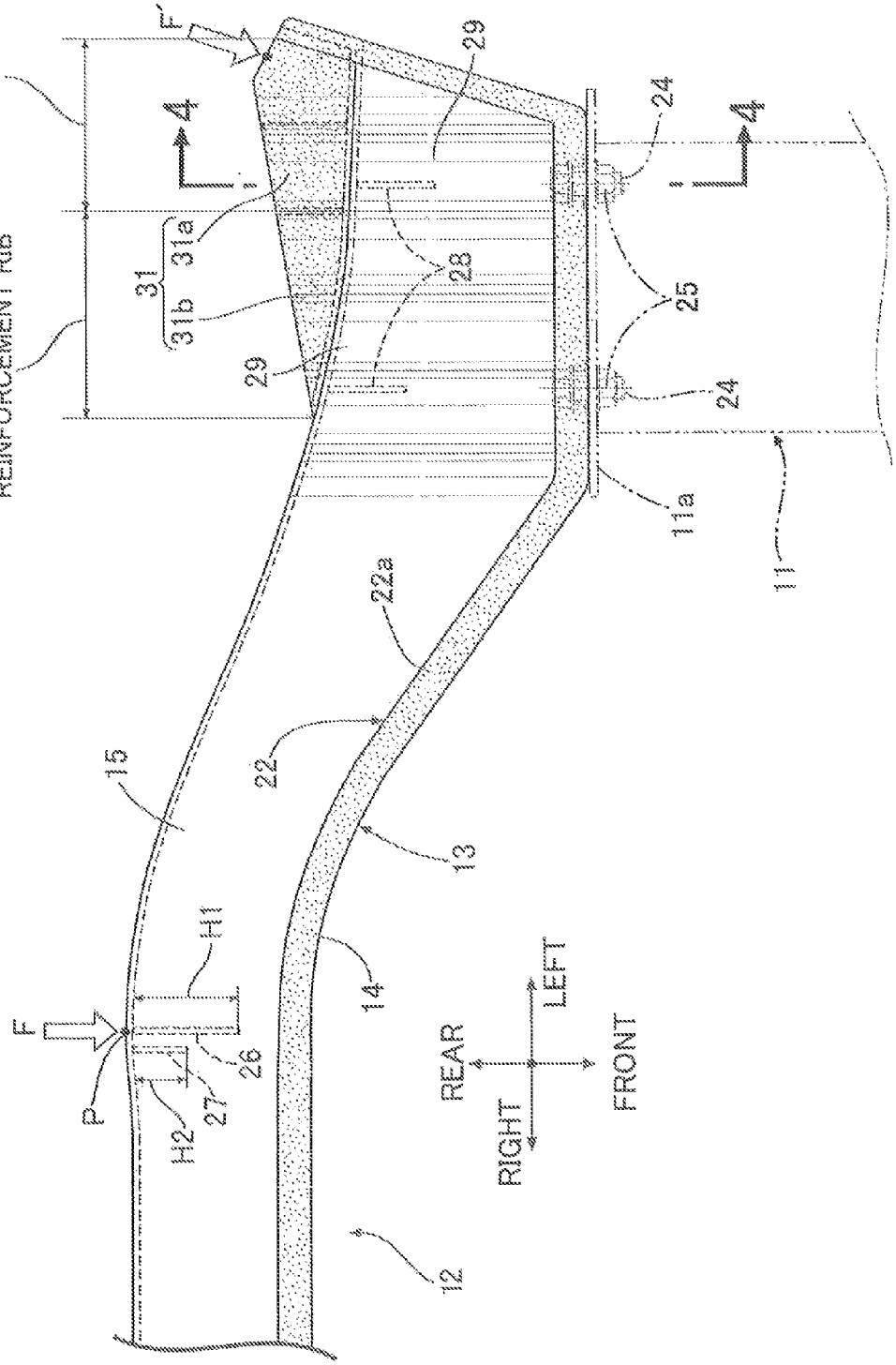
FIG. 3 is an enlarged view of a portion 3 in FIG. 2. (First Embodiment)
Figure 6:
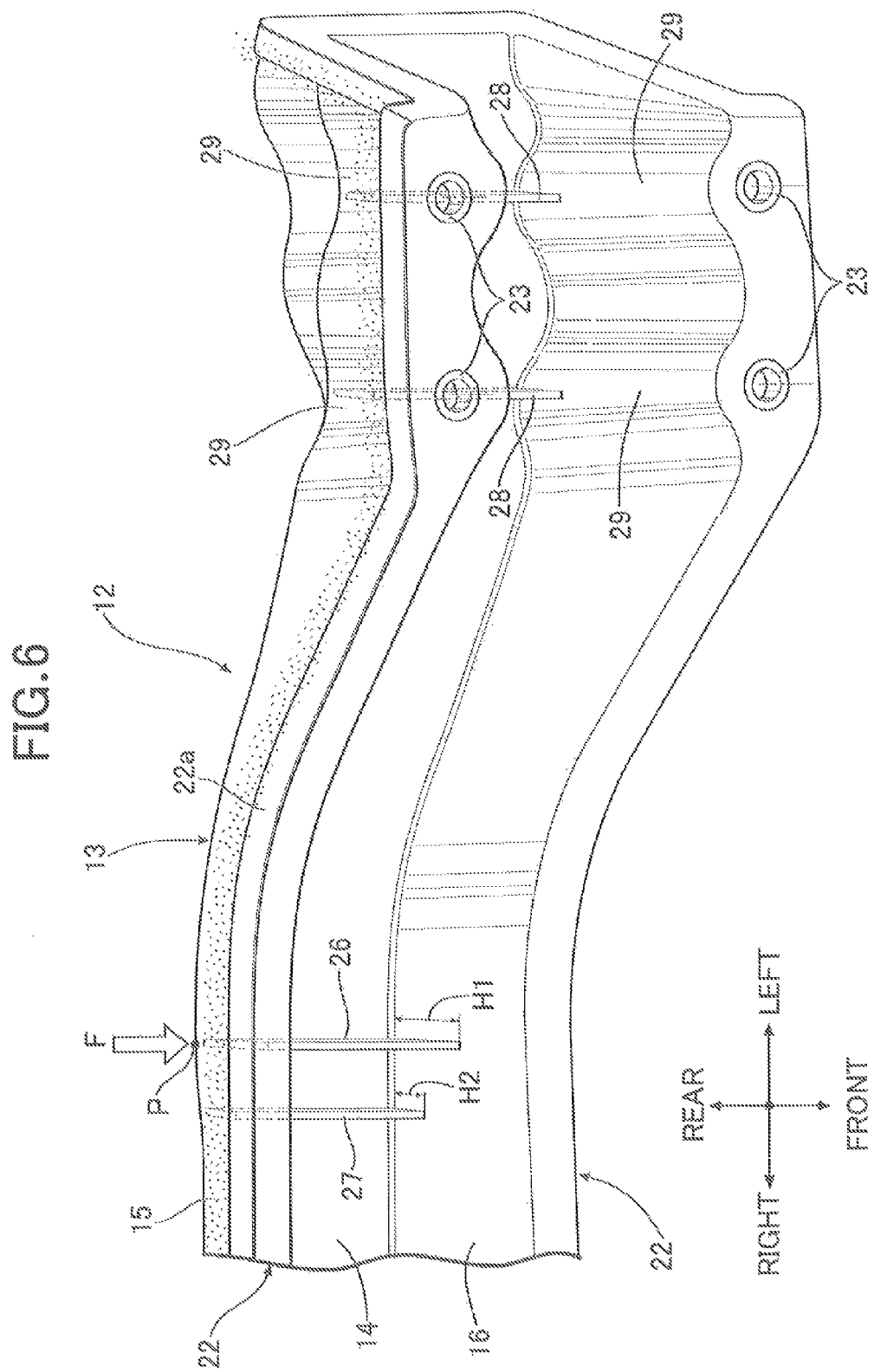
FIG. 6 is a view taken in a direction of an arrow 6 in FIG. 1. (First Embodiment)

As shown in FIG. 2, FIG. 3, and FIG. 6, a reinforcement rib 26 to connect the front face of the bottom wall 14, the lower face of the upper wall 15, and the upper face of the lower wall 16 is integrally formed as part of the discontinuous fiber-reinforced resin layer 21 at a position corresponding to each impact load input portion P of the bumper beam body 13. Moreover, a load distribution rib 27 to connect the front face of the bottom wall 14, the lower face of the upper wall 15, and the upper face of the lower wall 16 is integrally formed as part of the discontinuous fiber-reinforced resin layer 21 in the vicinity of the reinforcement rib 26 and near a boundary portion between the linear section 17a and each curved section 17b. A height H1 of the reinforcement rib 26 is set greater than a height H2 of the load distribution rib 27.

Furthermore, two reinforcement ribs 28 to connect the front face of the bottom wall 14, the lower face of the upper wall 15, and the upper face of the lower wall 16 are integrally formed as part of the discontinuous fiber-reinforced resin layer 21 at positions of each large sectional area portion 18 of the bumper beam body 13, which are in alignment with the respective positions of the metal collars 23 in the front-rear direction.

Figure 5:
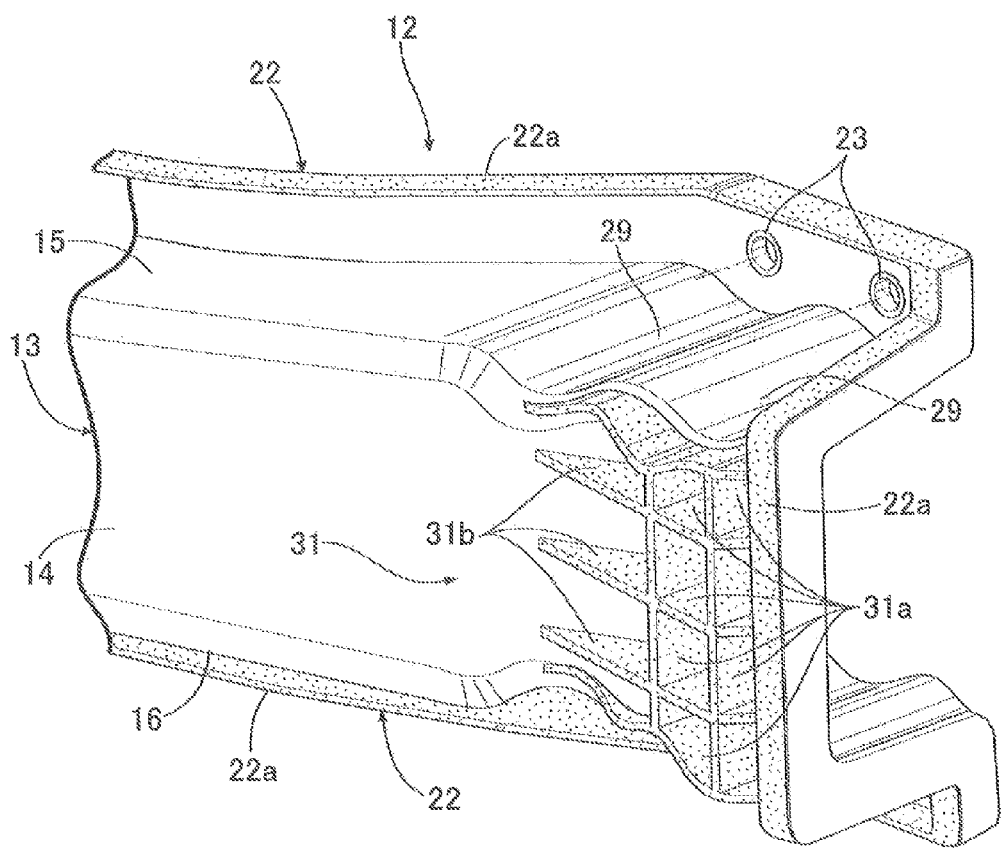
FIG. 5 is an enlarged view of a portion 5 in FIG. 1. (First Embodiment)

As shown in FIG. 2, FIG. 5, and FIG. 6, two groove-shaped bead portions 29 extending in the front-rear direction are formed at positions of the upper wall 15 and the lower wall 16 of each large sectional area portion 18 of the bumper beam body 13, the positions being in alignment with the respective positions of the metal collars 23 in the front-rear direction and in alignment with an axis of the rear side frame 11.

As shown in FIG. 2, FIG.3, and FIG. 5, an impact absorbing portion 31 made of fiber-reinforced resin which is made by glass short fibers being bonded together by use of a thermoplastic resin such as nylon and the like, is integrally provided to a rear face of each large sectional area portion 18 of the bumper beam body 13. The impact absorbing portion 31 includes honeycomb cells 31a located outside in the vehicle width direction, and multiple reinforcement ribs 31b located inside in the vehicle width direction. The honeycomb cells 31a are formed into a square lattice shape having axes extending in the front-rear direction. The reinforcement ribs 31b are each formed into a triangular shape and arranged to support the honeycomb cells 31a from the inside in the vehicle width direction.

Figure 4:
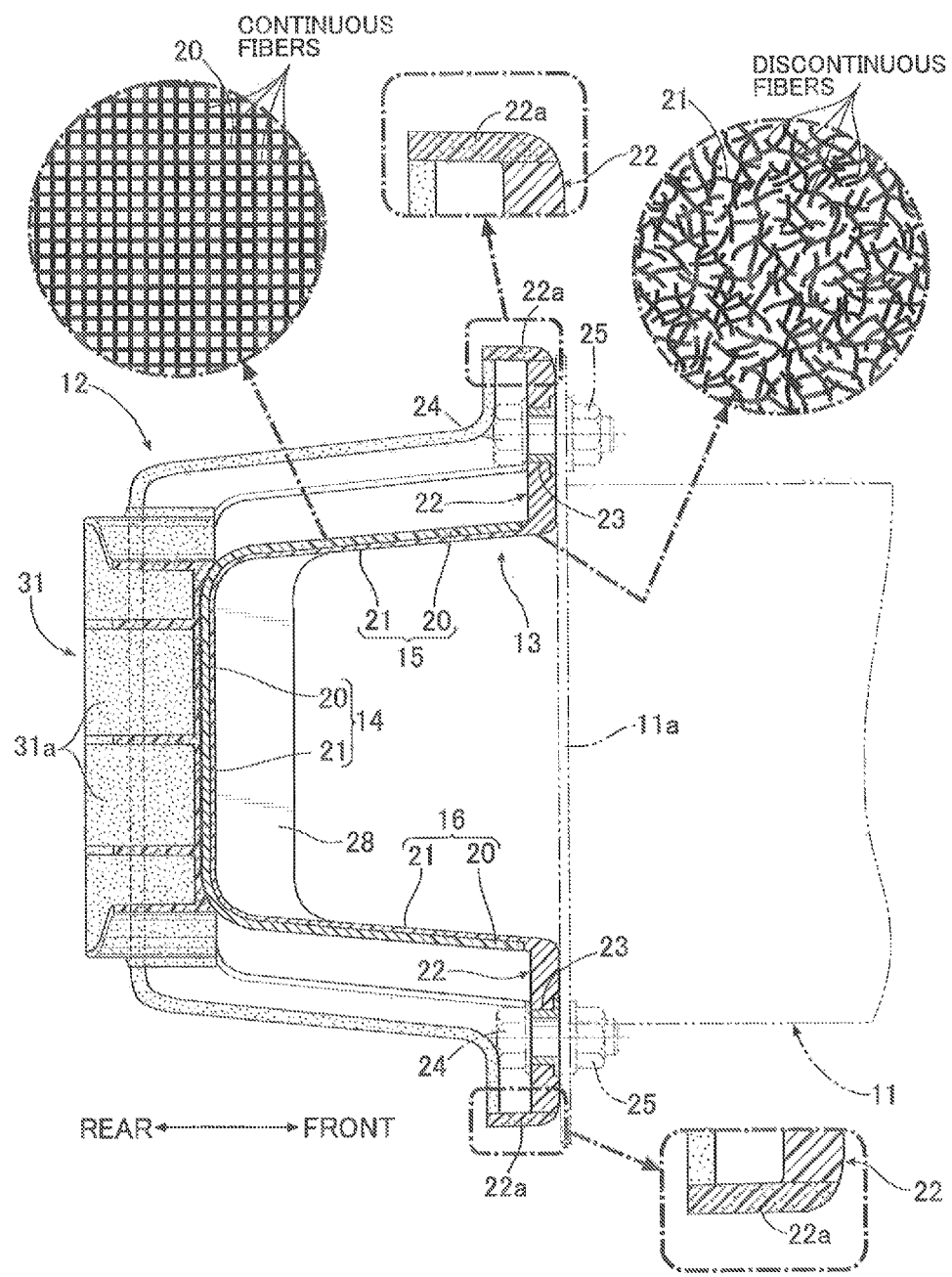
FIG. 4 is a sectional view taken along a line 4-4 in FIG. 3. (First Embodiment)

As shown in FIG. 4 and FIG. 5, an outer peripheral edge of the flange 22 is provided with a tip end portion 22a which is folded rearward, or inward in the vehicle width direction. The tip end portion 22a is made of fiber-reinforced resin containing the same glass short fibers as those in the fiber-reinforced resin forming the impact absorbing portion 31. Moreover, the tip end portion 22a and the impact absorbing portion 31 are integrally connected to each other. The fiber-reinforced resin containing the glass short fibers and forming the impact absorbing portion 31 and the tip end portion 22a of the flange 22 is shown by dots in the figures.

As shown in FIG. 7A, a press-forming die 41 for press-forming the bumper beam body 13 includes a female die 42 having a recessed cavity 42a to form the continuous fiber-reinforced resin layer 20, and a male die 43 having a projecting core 43a to form the discontinuous fiber-reinforced resin layer 21. In the state where the press-forming die 41 is opened, a preheated continuous fiber prepreg 20' and a preheated discontinuous fiber prepreg 21' are placed between the cavity 42a of the female die 42 and the core 43a of the male die 43, and then the press-forming die 41 is closed. Thus, the bumper beam body 13 is press-formed (see FIG. 7A and FIG. 7B). At this time, the reinforcement ribs 26, the load distribution ribs 27, and the reinforcement ribs 28 of the bumper beam body 13 are integrally formed easily as part of the highly formable discontinuous fiber-reinforced resin layer 21.

Subsequently, as shown in FIG. 7C, the bumper beam body 13 is set between a female mold 45 and a male mold 46 of an injection mold 44, and the molten thermoplastic resin such as nylon and the like containing the glass short fibers is injected into a space formed between the bumper beam body 13 and the injection mold 44. Thus, each impact absorbing portion 31 and the tip end portion 22a of the flange 22, which are made of the fiber-reinforced resin containing the glass short fibers, are injection-molded so as to be integrated with the bumper beam body 13 (see FIG. 7D). A resin containing relatively long continuous fibers or discontinuous fibers cannot be injection-molded because such a resin clogs up a nozzle. On the other hand, the resin containing the short fibers which are relatively short can be injection-molded since the resin does not clog up the nozzle.

Next, operation of the embodiment of the present invention provided with the above configuration will be described.

When a rear bumper of a vehicle causes a minor collision with a front bumper of another vehicle, for example, the conventional rear bumper beam which is simply curved in such a way as to project rearward has a problem that a large bending moment acts on the central part in the vehicle width direction of the bumper beam because the impact load is inputted intensively on the single point at the center in the vehicle width direction of the bumper beam.

In contrast, since the rear bumper beam 12 of the embodiment shown in FIG. 2 includes the pair of right and left impact load input portions P which project most rearward. Accordingly, the impact loads F are intensively inputted to the pair of impact load input portions P. As a consequence, a maximum value of the bending moment acting on the central part in the vehicle width direction of the rear bumper beam 12 is reduced. Thus, it is possible to enhance strength of the rear bumper beam 12 against the bending deformation.

Furthermore, the bumper beam body 13 includes: the small sectional area portion 17 located at the center in the vehicle width direction; the pair of sectional area changing portions 19 connected to the outer sides in the vehicle width direction of the small sectional area portion 17 and each having the gradually increasing sectional area; and the pair of large sectional area portions 18 connected to the outer sides in the vehicle width direction of the sectional area changing portions 19. Accordingly, when the impact loads F are inputted to the pair of impact load input portions P, the sectional area changing portions 19 and the large sectional area portions 18 can bear the bending moment, thereby enhancing the strength while achieving weight reduction of the bumper beam body 13 by reducing the thickness thereof.

Meanwhile, the bumper beam body 13 is a layered body including at least two layers of: the continuous fiber-reinforced resin layer 20 formed by orienting the glass continuous fibers in the vehicle width direction as well as in the directions orthogonal thereto and then bonding the glass continuous fibers together by use of the thermoplastic resin; and the discontinuous fiber-reinforced resin layer 21 formed by orienting the glass discontinuous fibers in random directions and then bonding the glass discontinuous fibers together by use of the thermoplastic resin. By applying both the expensive continuous fiber-reinforced resin layer 20 and the inexpensive discontinuous fiber-reinforced resin layer 21 to the bumper beam body 13, it is possible to secure the strength required in the bumper beam body 13 by use of the continuous fiber-reinforced resin layer 20 having the high strength while achieving cost reduction as compared to the case of forming the bumper beam body 13 entirely by use of the expensive continuous fiber-reinforced resin layer 20.

In the meantime, the bumper beam body 13 includes the bottom wall 14, the upper wall 15, and the lower wall 16, and has the angular U-shaped section opened on the front side. Here, the bumper beam body 13 includes the reinforcement ribs 26, the load distribution ribs 27, and the reinforcement ribs 28, which are formed from the discontinuous fiber-reinforced resin layer 21 and designed to connect the bottom wall 14, the upper wall 15, and the lower wall 16. Thus, it is possible to enhance the strength of the bumper beam body 13 by easily forming the reinforcement ribs 26, the load distribution ribs 27, and the reinforcement ribs 28 from the discontinuous fiber-reinforced resin layer 21 which is excellent in fluidity during a forming process.

In particular, by providing the reinforcement rib 26 at each impact load input portion P where a large load is inputted, it is possible to reinforce the impact load input portions P and to prevent the bumper beam body 13 from local fracture.

Meanwhile, the small sectional area portion 17 includes the linear section 17a extending linearly in the vehicle width direction, and the curved sections 17b which are curved from the opposite ends in the vehicle width direction of the linear section 17a toward the sectional area changing portions 19. Since each load distribution rib 27 is provided near the boundary portion between the linear section 17a and the corresponding curved section 17b, the strength of the bumper beam body 13 can be enhanced, by distributing to the load distribution rib 27 a compression load which acts on the bottom wall 14 due to the impact load F inputted to the impact load input portion P, so as to bear the compression load.

In the meantime, at the edge portion of the bumper beam body 13, the discontinuous fiber-reinforced resin layer 21 is provided with the flange 22 which covers the edge portion of the continuous fiber-reinforced resin layer 20. Thus, it is possible to enhance the bending strength of the bumper beam body 13 by using the flange 22 made of the discontinuous fiber-reinforced resin, to prevent occurrence of cracks at the edge portion of the continuous fiber-reinforced resin layer 20 due to stress concentration, and to achieve cost reduction by reducing the use of the expensive continuous fiber-reinforced resin layer 20 by the amount corresponding to the flange 22.

Meanwhile, the discontinuous fiber-reinforced resin layer 21 includes the multiple metal collars 23 to be attached to the rear ends of the rear side frames 11 of the large sectional area portions 18. Moreover, the reinforcement ribs 28 are located at the same positions in the vehicle width direction as those of the multiple metal collars 23, that is, in alignment with the multiple metal collars 23 in the front-rear direction. Thus, it is possible to inhibit the large sectional area portions 18 having the angular U-shaped sections from deformation such that the openings are not spread in the up-down direction after the forming process, to prevent displacements of the metal collars 23, and thereby to facilitate an operation to attach the bumper beam body 13 to the rear side frames 11.

In addition, the large sectional area portions 18 attached to the rear ends of the rear side frames 11 include the bead portions 29, which are aligned on the axes of the rear side frames 11 and extend in the front-rear direction. Accordingly, in case of an offset collision or a collision at high speed where it is not possible to absorb impact energy by use of the entire bumper beam body 13, an effect to absorb the impact energy can be enhanced by actively causing a crush of any of the large sectional area portions 18 with the increased strength by the bead portions 29.

Meanwhile, the impact absorbing portion 31 which includes the honeycomb cells 31a each having the axis extending in the front-rear direction, and the reinforcement ribs 31b supporting the honeycomb cells 31a from the inside in the vehicle width direction, is provided to the rear face of each large sectional area portion 18. Accordingly, when an impact load F' is obliquely inputted to an outer end in the vehicle width direction of the bumper beam body 13 (see FIG. 2 and FIG. 3), the honeycomb cells 31a which receive the impact load F' first can get crushed and thereby absorb the impact energy. Moreover, the triangular reinforcement ribs 31b block the honeycomb cells 31a from collapsing inward in the vehicle width direction, and can thus facilitate the crush of the honeycomb cells 31a in the front-rear direction and enhance the effect to absorb the impact energy. Furthermore, the impact load F' of the oblique collision inputted to the impact absorbing portion 31 is reliably transmitted to the rear side frame 11 via the large sectional area portion 18 reinforced by the reinforcement ribs 28. Thus, it is possible to facilitate the crush of the impact absorbing portion 31 and to further enhance the effect to absorb the impact energy.

In particular, each outer end portion in the vehicle width direction of the bumper beam body 13 is bent forward and a width in the front-rear direction of the impact absorbing portion 31 is gradually increased from the inside to the outside in the vehicle width direction. As a consequence, it is possible not only to enhance the effect to absorb the impact energy by increasing a dimension in the front-rear direction of the outer end portion in the vehicle width direction of each honeycomb cell 31a and thereby increasing a crush stroke of the honeycomb cells 31a when the oblique impact load F' is inputted to the outer end portion in the vehicle width direction of the rear bumper beam 12, but also to facilitate the crush of the honeycomb cells 31a in the front-rear direction by forming each of the reinforcement ribs 31b into the triangular shape so as to reliably block the collapse of the honeycomb cells 31a.

Meanwhile, the bumper beam body 13 includes the flange 22 formed at the edge portion thereof, and the tip end portion 22a of the flange 22 and the impact absorbing portions 31 are integrally formed from the fiber-reinforced resin which is made by the glass short fibers being bonded together by use of the thermoplastic resin. As a consequence, it is possible not only to enhance the bending strength of the bumper beam body 13 by the reinforcement with the flange 22, but also to further enhance the strength of the bumper beam body 13 by integrally forming the tip end portion 22a of the flange 22 and the impact absorbing portions 31.

In the meantime, the edge of the flange 22 is bound to cause burrs since the bumper beam body 13 is press-formed. Here, the tip end portion 22a of the flange 22 is formed by injection molding of the fiber-reinforced resin containing the glass short fibers and is then integrated with the edge of the flange 22. Accordingly, it is possible not only to form the tip end portion 22a of the flange 22 easily, but also to reduce a manufacturing cost since it is not necessary to conduct an operation to remove burrs in the flange 22 of the press-formed bumper beam body 13.

While the embodiment of the present invention has been described above, it is to be understood that various modifications are applicable to the present invention within the range not departing from the gist thereof.

For example, although the embodiment has described the rear bumper beam 12, the present invention is also applicable to a front bumper beam. Here, the outside in the front-rear direction corresponds to the rear side in the case of the rear bumper beam 12 while the outside in the front-rear direction corresponds to the front side in the case of the front bumper beam.

What is claimed is:

1. An automobile bumper beam which is made of fiber-reinforced resin and configured to be disposed in a vehicle width direction, the bumper beam comprising:
   a small sectional area portion located at a center in the vehicle width direction;
   a pair of sectional area changing portions continuous to outer sides in the vehicle width direction of the small sectional area portion and each having a sectional area gradually increasing from the small sectional area portion; and
   a pair of large sectional area portions continuous to outer sides in the vehicle width direction of the pair of sectional area changing portions and each having a larger sectional area than that of the small sectional area portion, wherein
   the small sectional area portion projects most outward in a front-rear direction at a pair of impact load input portions provided on opposite end sides in the vehicle width direction of the small sectional area portion.

2. The automobile bumper beam according to claim 1, wherein
   a bumper beam body of the bumper beam is a layered body including at least two layers of
     a continuous fiber-reinforced resin layer formed by orienting continuous fibers in the vehicle width direction as well as in a direction orthogonal to the vehicle width direction and by bonding the continuous fibers together by use of thermoplastic resin, and
     a discontinuous fiber-reinforced resin layer formed by orienting discontinuous fibers in random directions and bonding the discontinuous fibers together by use of thermoplastic resin,
   the bumper beam body includes a bottom wall, an upper wall, and a lower wall, and has an angular U-shaped section opened on an inner side in the front-rear direction, and
   the bumper beam body further includes a rib made of the discontinuous fiber-reinforced resin layer and connecting the bottom wall, the upper wall, and the lower wall.

3. The automobile bumper beam according to claim 2, wherein the rib includes a first reinforcement rib provided at each of the impact load input portions.

4. The automobile bumper beam according to claim 2, wherein
   the small sectional area portion includes:
   a linear section extending linearly in the vehicle width direction; and
   curved sections which are curved from opposite ends in the vehicle width direction of the linear section toward the corresponding sectional area changing portions, and
   the rib includes a load distribution rib provided near a boundary portion between the linear section and each of the curved sections.

5. The automobile bumper beam according to claim 2, wherein the discontinuous fiber-reinforced resin layer includes a flange located at an edge portion of the bumper beam body and covering an edge portion of the continuous fiber-reinforced resin layer.

6. The automobile bumper beam according to claim 2, wherein
   the discontinuous fiber-reinforced resin layer includes a plurality of vehicle body attaching portions located at each of the large sectional area portions and to be attached to a vehicle body, and
   the rib includes a second reinforcement rib provided at the same position in the vehicle width direction as that of at least one of the plurality of vehicle body attaching portions.

7. The automobile bumper beam according to claim 6, wherein the large sectional area portions include bead portions to be aligned on an axis of a vehicle body frame and extending in the front-rear direction, the large sectional area portions being configured to be attached to outer ends in the front-rear direction of the vehicle body frame by using the vehicle body attaching portions.

8. The automobile bumper beam according to claim 1, wherein an impact absorbing portion is provided on an outer face in the front-rear direction of each large sectional area portion, the impact absorbing portion including a honeycomb cell having an axis extending in the front-rear direction and a third reinforcement rib supporting the honeycomb cell from inside in the vehicle width direction.

9. An automobile bumper beam which is made of fiber-reinforced resin and configured to be disposed in a vehicle width direction, the bumper beam comprising:
   a bumper beam body having a continuous fiber-reinforced resin layer formed by orienting continuous fibers in the vehicle width direction as well as in a direction orthogonal to the vehicle width direction and bonding the continuous fibers together by use of thermoplastic resin, wherein
   an impact absorbing portion is provided on an outer face in the front-rear direction of each of opposite ends in the vehicle width direction of the bumper beam body, the impact absorbing portion including a honeycomb cell having an axis extending in a front-rear direction and a reinforcement rib supporting the honeycomb cell from inside in the vehicle width direction.

10. The automobile bumper beam according to claim 9, wherein
    the bumper beam body includes a flange formed at an edge portion of the bumper beam body, and
    a tip end portion of the flange and the impact absorbing portion are integrally formed by using fiber-reinforced resin which is made by short fibers being bonded together by use of thermoplastic resin.

11. The automobile bumper beam according to claim 10, wherein
    the bumper beam body is formed by stacking and press-forming at least two layers of the continuous fiber-reinforced resin layer and a discontinuous fiber-reinforced resin layer which is formed by orienting discontinuous fibers in random directions and bonding the discontinuous fibers together by use of thermoplastic resin, and
    the tip end portion of the flange is injection-molded and integrated with the flange of the press-formed bumper beam body.

12. The automobile bumper beam according to claim 11, wherein the flange is formed by covering an edge portion of the continuous fiber-reinforced resin layer with the discontinuous fiber-reinforced resin layer.

13. The automobile bumper beam according to claim 10, wherein vehicle body attaching portions to be attached to outer ends in the front-rear direction of a vehicle body frame are provided at a portion of the flange located on inside in the front-rear direction of the impact absorbing portion, and a second reinforcement rib is provided to the bumper beam body at a position sandwiched by the flange and the vehicle body attaching portions.

14. The automobile bumper beam according to claim 9, wherein each of outer end portions in the vehicle width direction of the bumper beam body is bent inward in the front-rear direction, and a width in the front-rear direction of the impact absorbing portion is increased from inside toward outside in the vehicle width direction.

15. The automobile bumper beam according to claim 3, wherein the small sectional area portion includes:

a linear section extending linearly in the vehicle width direction; and curved sections which are curved from opposite ends in the vehicle width direction of the linear section toward the corresponding sectional area changing portions, and the rib includes a load distribution rib provided near a boundary portion between the linear section and each of the curved sections.

16. The automobile bumper beam according to claim 3, wherein the discontinuous fiber-reinforced resin layer includes a flange located at an edge portion of the bumper beam body and covering an edge portion of the continuous fiber-reinforced resin layer.

17. The automobile bumper beam according to claim 3, wherein the discontinuous fiber-reinforced resin layer includes a plurality of vehicle body attaching portions located at each of the large sectional area portions and to be attached to a vehicle body, and the rib includes a second reinforcement rib provided at the same position in the vehicle width direction as that of at least one of the plurality of vehicle body attaching portions.

18. The automobile bumper beam according to claim 2, wherein an impact absorbing portion is provided on an outer face in the front-rear direction of each large sectional area portion, the impact absorbing portion including a honeycomb cell having an axis extending in the front-rear direction and a third reinforcement rib supporting the honeycomb cell from inside in the vehicle width direction.

19. The automobile bumper beam according to claim 11, wherein vehicle body attaching portions to be attached to outer ends in the front-rear direction of a vehicle body frame are provided at a portion of the flange located on inside in the front-rear direction of the impact absorbing portion, and a second reinforcement rib is provided to the bumper beam body at a position sandwiched by the flange and the vehicle body attaching portions.

20. The automobile bumper beam according to claim 10, wherein each of outer end portions in the vehicle width direction of the bumper beam body is bent inward in the front-rear direction, and a width in the front-rear direction of the impact absorbing portion is increased from inside toward outside in the vehicle width direction.

* * * * *